United States Patent [19]

Nabae

[11] Patent Number: 4,840,685

[45] Date of Patent: Jun. 20, 1989

[54] ALUMINUM ALLOY FOR THE SUBSTRATE OF MAGNETIC DISK

[75] Inventor: Motohiro Nabae, Nikko, Japan

[73] Assignee: Furukawa Aluminum Co., Ltd., Tokyo, Japan

[21] Appl. No.: 183,441

[22] Filed: Apr. 13, 1988

Related U.S. Application Data

[63] Continuation of Ser. No. 864,313, May 19, 1986, abandoned.

[30] Foreign Application Priority Data

May 21, 1985 [JP] Japan .................................. 60-108800

[51] Int. Cl.$^4$ ............................................. C22C 21/00
[52] U.S. Cl. .................................... 148/439; 148/440; 420/532; 420/533; 420/541

[58] Field of Search ............... 420/531, 532, 533, 541; 148/439, 440

[56] References Cited

U.S. PATENT DOCUMENTS 2,301,759 11/1942 Stroup ................................. 148/439

Primary Examiner—R. Dean
Attorney, Agent, or Firm—Oblon, Spivak, McClelland, Maier & Neustadt

[57] ABSTRACT

An aluminum alloy for the substrate of magnetic disk is disclosed, wherein 2 to 6 wt % of Mg and further either one or two of Cu within a range of 0.12 to 2.0 wt % and Zn within a range of 0.28 to 7.0 wt % are contained, and the remainder comprises of Al and inevitable impurities.

10 Claims, No Drawings

ALUMINUM ALLOY FOR THE SUBSTRATE OF MAGNETIC DISK

This application is a continuation of application Ser. No. 864,313, filed on May 19, 1986, now abandoned.

BACKGROUND OF THE INVENTION

The present invention relates to an aluminum alloy for the substrate of a magnetic disk and, in particular, to the improvement in the adhesion of electroless plating being the primer treatment for the covering with magnetic substance and the surface smoothness.

For a magnetic disk used for the recording devices of electronic computer, one wherein the surface of substrate comprising of aluminum alloy is covered with magnetic substance is used generally. Such magnetic disk is manufactured such that, after the substrate was processed to a predetermined thickness and the surface was polished mirror-like a mixture of the powder of magnetic substance with the powder of resin is coated, and then the film of magnetic substance is formed by the heat treatment.

Recently, it has become necessary for the magnetic disk to have a large capacity and a high density. As a result, the magnetized area per one bit has been made increasingly minute in the magnetic disk and, at the same time, it has become necessary also to decrease the clearance between the magnetic head and the magnetic disk resulting in the requirement for the thinning and the improvement in the abrasion resistance of the film of magnetic substance. For this reason, the magnetic disk is proposed, which is manufactured such that, after the substrate has been processed to a predetermined thickness and the surface was finished mirror-like, a hard nonmagnetic metal, for example, Ni-P alloy is plated electrolessly as the primer treatment for the covering with magnetic substance, and then the magnetic substance, for example, Co-Ni-P alloy is covered by sputtering or plating.

For the substrate of such magnetic disk, the following characteristics are required.

(1) To be nonthermal treatment type and to have sufficient strength possible to withstand various processings and high-speed rotation at the time of the use.

(2) To be light in weight and to be obtained excellent mirror face by polishing without appearing the surface defects such as pits.

(3) To be excellent in the adhesion of electroless plating being the primer treatment and in the surface smoothness without the defects such as pits.

As the substrate for magnetic disk satisfying the characteristics as these, JIS A5086 alloy (Mg 3.5–4.5 wt %, Fe≦0.50 wt %, Si≦0.40 wt %, Mn 0.20–0.7 wt %, Cr 0.05–0.25 wt %, Cu≦0.10 wt %, Ti≦0.15 wt %, Zn≦0.25 wt % and the remainder Al) or the alloy having made the quantity of intermetallic compounds formed in the matrix less by regulating Fe, Si, etc. which are impurities in JIS A5086 is used.

However, since, with the substrate comprising the JIS A5086 alloy aforementioned, the adhesion of electroless plating being the primer treatment for the covering with magnetic substance is inferior, there has been a problem that the film of electroless plating is peeled off during the covering process with magnetic substance or the use. Moreover, the surface smoothness after the electroless plating could not be said also to be sufficient. Namely, the intermetallic compounds drop out at the time of zincate treatment to form the pits. These pits may disappear by subsequent polishing in many times if the thickness of electroless plating is as thick as about 20 μm. But, the recent trend is to make the thickness of plating thin, so that even with aluminum alloy, the pits having not occurred by the polishing after plating hitherto, there has become to happen such cases as the pits occur because of the thinning of film. Moreover, the plates of aluminum alloy are stamped out in a predetermined size and planed and polished thereafter. At that time, there may be cases when the intermetallic compounds drop out to form pit defects. Based on these facts, it is required strongly to decrease the number of the intermetallic compounds in aluminum alloy and to make also the size of them small.

SUMMARY OF THE INVENTION

As a result of various investigations in view of the situation, the facts that the adhesion of electroless Ni plating and the smoothness of the surface of plating may be realized by allowing the zincate film of pretreatment to adhere thinly, uniformly and densely, and that the adhesion of the film of Ni plating is affected not only by the adhering situation of zincate film, but also the crystal particles of material and the adhesion is improved if the crystal particles are minute have been known. In consequence of further investigation, the aluminum alloy for the substrate of magnetic disk has been developed, wherein the adhesion of electroless plating being the primer treatment is improved and the surface characteristics such as the smoothness of the surface of plating etc. are enhanced. Namely, the invention is characterized in that 2 to 6 wt % (hereinafter wt % will be abbreviated as %) of Mg and further either one or two of Cu within a range of 0.12 to 2.0% and Zn within a range of 0.28 to 7.0% are contained, and the remainder comprises of Al and inevitable impurities.

DETAILED DESCRIPTION OF THE INVENTION

In the invention, the addition of Mg is made for the purpose of enhancing the strength as the substrate. The reason why the content thereof was confined to 2 to 6% is that sufficient strength cannot be obtained when using less than 2% and that the formation of the nonmetallic accompanying compounds such as MgO etc. becomes remarkable through the high-temperature oxidation during melting and casting together with the formation of Al-Mg intermetallic compound when using more than 6%.

Moreover, Cu or/and Zn is added to decrease the dissolution amount of Al and to make the film thin, uniform and dense at the time of zincate treatment resulting in the enhancement in the surface smoothness and the adhesion of electroless plating thereafter. The reason why the contents of Cu and Zn were confied to less than 2.0% and less than 7.0%, respectively, is because of that, if the content of either one exceeds the upper limit, the rolling processability and the corrosion resistance are lowered, in particular, since the corrosion resistance of the material is inferior also in the process of plating treatment, the zincate treatment cannot be made uniformly and the adhesion of plating and the smoothness of surface become also poor. Moreover, the reason why not less than 0.12% of Cu or not less than 0.28% of Zn is contained is due to that sufficient effect cannot be obtained at the time of zincate treatment unless either one is contained more than this level.

Besides, if the content of Cu or/and Zn lie within a range described above, the dissolution amount of Al at the time of zincate treatment can be decreased and the brilliance, that is, the smoothness of the surface after the electroless plating can be increased. Moreover, the particle diameter of the crystals of the alloy with the composition described above becomes as fine as less than 80 μm through the ordinary manufacturing process. This fact is advantageous more for the improvement in the surface smoothness after electroless plating being the primer treatment for the covering with magnetic substance.

Besides, depending on the manufacturing conditions of material (for example, in the case of the annealing of material at high temperature and for long time), there is a case when the crystal particles become as large as more than 80 μm, but, if they become large, the surface smoothness after plating becomes poor. Therefore, it is desirable to make the crystal particles small.

According to the invention, there exist inevitable impurities. Fe is one of such impurities, but it can be contained deliberately in amount not more than 0.1% together with 2 to 6% of Mg and 0.05, preferably 0.12 to 2.0% of Cu or 0.05, preferably 0.28 to 7.0% of Zn. The content more than 0.1% of Fe is not desirable, since it forms the crystallized matters of the type of Al-Fe, which become to large-size and are apt to drop out at the time of planing, polishing and zincate treatment of the substrate to form the pit defects.

Furthermore, when 2 to 6% of Mg, 0.05, preferably 0.12 to 2.0% of Cu or 0.05, preferably 0.28 to 7.0% of Zn and not more than 0.1% of Fe are contained and the remainder comprises of Al and inevitable impurities as above, either one or not less than two kinds of Cr within a range of not more than 0.3%, Zr within a range of not more than 0.3%, Ti within a range of not more than 0.05% and B within a range of not more than 0.05% can also be contained in total amount of not more than 0.5%.

The addition of Cr, Zr, Ti and B is made for the sake of making the crystal particles minute and the surface after plating smoother. The reason why the contents of Cr and Zr are confined together to not more than 0.3% is due to that the large-sized intermetallic compounds are formed if the contents exceed the upper limit. Also, the reason why the contents of Ti and B are confined together to not more than 0.05% is due to that, even if contained exceeding this upper limit, excess Ti and B are removed and become useless during the treatment of melt through filter at the time of casting. Moreover, the reason why the total content of not less than two kinds of Cr, Zr, Ti and B is confined to not more than 0.5% is because of that, if allowed to be contained exceeding this level, the large-sized intermetallic compounds are formed and they are apt to drop out at the time of planing, polishing and zincate treatment to form pit defects.

EXAMPLE 1

The commercial Al metal with a purity of higher than 99.7% was melted and the elements for alloy were added to this to prepare the alloy melts with ingredient compositions as shown in Table 1. After degassing and settling treatment, these melts were filtered through the filter and casted cooling with water to obtain ingots having a thickness of 350 mm, a width of 1000 mm and a length of 2000 mm. After planed both faces by 10 mm each, these ingots were put into the soaking treatment for about 6 hours at a temperature of 480±30° C. Thereafter, according to the normal method, they were converted to the plates having a thickness of 2 mm by hot rolling and cold rolling.

From these cold rolled plates having a thickness of 2 mm, disks having a diameter of 200 mm were stamped out and, after annealed for 2 hours at 350° C., these were finished mirror-like by rough polishing and finish polishing.

Of these disks, when the particle diameters of maximum crystal particle were investigated by the microscopic examination, all of them showed to be 25 to 72 μm. Moreover, after these mirror plates were degreased with commercial solvent and etched for 30 seconds with 5% aqueous solution of NaOH at 60° C., they were treated for 30 seconds with 30% aqueous solution of $HNO_3$ at room temperature to remove the smuts. Then, following the zincate treatment, electroless Ni-P alloy plating was carried out, and the adhesion of electroless plating and the smoothness of surface were examined. These results are shown in Table 1 together.

Besides, the zincate treatment was carried out twice using Arp 302ZN (trade name, Okuno Pharmaceutical) and, for the electroless Ni-P alloy plating, Nyclad 719 (trade name, Okuno Pharmaceutical) was used. Moreover, as to the test of adhesion, after the electroless plating, samples with an area of 50 mm square were cut out and heated for 30 minutes at a temperature of 300° C. Then, they were cooled immediately with water, and the peeling-off and the swelling of plating resulting from the difference in the thermal expansion between Al alloy and Ni-P alloy were examined, thereby, one caused no peeling-off and swelling was marked with ◎, one caused them slightly with ○, and one caused them severely with × ( ◎ and ○ are acceptable, × is unacceptable). As to the smoothness of surface after plating, the reflectance was measured after the electroless plating.

TABLE 1

| Division of alloy | No. | Composition of alloy (%) | | | | Adhesion | Smoothness of surface Reflectance (%) |
| --- | --- | --- | --- | --- | --- | --- | --- |
| | | Mg | Cu | Zn | Al | | |
| Alloy of the invention | 1-1 | 2.6 | 1.2 | — | Balance | ◎ | 88 |
| Alloy of the invention | 1-2 | 4.5 | 1.0 | — | " | ◎ | 96 |
| Alloy of the invention | 1-3 | 4.2 | 0.15 | — | " | ◎ | 96 |
| Alloy of the invention | 1-4 | 5.6 | 0.13 | — | " | ◎ | 90 |
| Alloy of the invention | 1-5 | 2.5 | — | 6.1 | " | ◎ | 91 |
| Alloy of the | 1-6 | 4.1 | — | 0.30 | " | ◎ | 89 |

TABLE 1-continued

| Division of alloy | No. | Composition of alloy (%) | | | | Adhesion | Smoothness of surface Reflectance (%) |
|---|---|---|---|---|---|---|---|
| | | Mg | Cu | Zn | Al | | |
| Alloy of the invention | 1-7 | 4.0 | — | 5.0 | " | ◉ | 96 |
| Alloy of the invention | 1-8 | 2.5 | 1.8 | 0.02 | " | ◉ | 95 |
| Alloy of the invention | 1-9 | 4.0 | 1.9 | 0.01 | " | ◉ | 88 |
| Alloy of the invention | 1-10 | 5.5 | 1.1 | 0.03 | " | ◉ | 90 |
| Alloy of the invention | 1-11 | 5.6 | 0.50 | 0.01 | " | ◉ | 87 |
| Alloy of the invention | 1-12 | 2.5 | 0.01 | 3.0 | " | ◉ | 92 |
| Alloy of the invention | 1-13 | 4.3 | 0.02 | 25 | " | ◉ | 88 |
| Alloy of the invention | 1-14 | 5.5 | 0.01 | 3.8 | " | ◉ | 89 |
| Alloy of the invention | 1-15 | 2.8 | 1.8 | 0.22 | " | ◉ | 93 |
| Alloy of the invention | 1-16 | 2.3 | 1.5 | 1.5 | " | ◉ | 97 |
| Alloy of the invention | 1-17 | 2.2 | 0.9 | 0.2 | " | ◉ | 89 |
| Alloy of the invention | 1-18 | 2.5 | 1.0 | 3.8 | " | ◉ | 92 |
| Alloy of the invention | 1-19 | 2.1 | 1.1 | 6.6 | " | ◉ | 90 |
| Alloy of the invention | 1-20 | 2.2 | 0.03 | 0.30 | " | ◉ | 81 |
| Alloy of the invention | 1-21 | 2.4 | 0.05 | 3.0 | " | ◉ | 89 |
| Alloy of the invention | 1-22 | 2.2 | 0.05 | 6.5 | " | ◉ | 90 |
| Alloy of the invention | 1-23 | 4.0 | 0.05 | 0.30 | " | ◉ | 93 |
| Alloy of the invention | 1-24 | 4.0 | 0.03 | 2.8 | " | ◉ | 92 |
| Alloy of the invention | 1-25 | 4.1 | 0.03 | 6.8 | " | ◉ | 93 |
| Alloy of the invention | 1-26 | 4.0 | 0.13 | 0.20 | " | ◉ | 89 |
| Alloy of the invention | 1-27 | 4.3 | 0.12 | 3.2 | Balance | ◉ | 88 |
| Alloy of the invention | 1-28 | 4.2 | 0.12 | 6.5 | " | ◉ | 87 |
| Alloy of the invention | 1-29 | 4.0 | 1.8 | 0.17 | " | ◉ | 90 |
| Alloy of the invention | 1-30 | 4.3 | 1.6 | 3.3 | " | ◉ | 93 |
| Alloy of the invention | 1-31 | 4.0 | 1.8 | 6.8 | " | ◉ | 89 |
| Alloy of the invention | 1-32 | 5.7 | 0.18 | 0.22 | " | ◉ | 88 |
| Alloy of the invention | 1-33 | 5.5 | 0.04 | 3.3 | " | ◉ | 92 |
| Alloy of the invention | 1-34 | 5.9 | 0.08 | 6.2 | " | ◉ | 87 |
| Alloy of the invention | 1-35 | 5.6 | 1.0 | 0.25 | " | ◉ | 85 |
| Alloy of the invention | 1-36 | 5.7 | 1.0 | 3.2 | " | ◉ | 95 |
| Alloy of the invention | 1-37 | 5.7 | 1.2 | 5.8 | " | ◉ | 88 |
| Alloy of the invention | 1-38 | 5.6 | 1.6 | 0.30 | " | ◉ | 92 |
| Alloy of the invention | 1-39 | 5.7 | 1.8 | 3.2 | " | ◉ | 87 |
| Alloy of the invention | 1-40 | 5.7 | 1.8 | 5.0 | " | ◉ | 91 |
| Comparative alloy | 1-41 | 3.5 | 0.10 | 0.12 | " | X | 62 |
| Comparative alloy | 1-42 | 5.6 | 0.02 | 0.05 | " | X | 55 |
| Comparative alloy | 1-43 | 4.3 | 0.10 | — | " | ○ | 58 |
| Comparative alloy | 1-44 | 4.0 | — | 0.23 | " | ○ | 65 |
| Comparative alloy | 1-45 | 4.1 | 0.10 | 0.20 | " | ○ | 60 |

TABLE 1-continued

| Division of alloy | No. | Composition of alloy (%) | | | | Adhesion | Smoothness of surface Reflectance (%) |
|---|---|---|---|---|---|---|---|
| | | Mg | Cu | Zn | Al | | |
| Comparative alloy | 1-46 | 4.0 | 2.5 | — | " | ○ | 64 |
| Comparative alloy | 1-47 | 4.2 | 2.5 | 3.0 | " | X | 61 |
| Comparative alloy | 1-48 | 4.0 | — | 7.5 | " | X | 58 |
| Comparative alloy | 1-49 | 4.1 | 1.6 | 7.5 | " | X | 63 |
| Conventional alloy | 1-50 | Mg 4.0—Mn 0.3—Cr 0.1—Cu 0.01—Zn 0.01—Al Balance | | | | X | 70 |
| Conventional alloy | 1-51 | Mg 3.8—Mn 0.5—Cr 0.2—Cu 0.05—Al Balance | | | | X | 72 |

As evident from Table 1, it can be seen that the adhesion of electroless plating is excellent by far and the reflectance, that is, the smoothness of surface is also good in the cases of alloys of the invention No. 1-1 to 1-40 compared with in the cases of conventional alloys (JIS A5086 alloys) No. 1-50 and 1-51. In the cases of No. 1-41 to 1-45 with less content of Cu or Zn, the performance in the zincate treatment is lowered, so that the adhesion of plating and the smoothness of surface are inferior.

Moreover, in the cases of comparative alloys No. 1-46 to 1-49 with more content of Cu or Zn, since the corrosion resistance of materials becomes poor in the process of plating treatment, the zincate treatment cannot be made uniformly and the adhesion of plating and the smoothness of surface are also inferior.

EXAMPLE 2

The commercial Al metal with a purity of higher than 99.7% was melted and the elements for alloy were added to this to prepare the alloy melts with ingredient compositions as shown in Table 2.

Subsequent processes for obtaining mirror-like disks, the pretreatments and the electroless Ni-P alloy plating were carried out similarly to Example 1, except that the temperature at the time of etching with 5% NaOH was 40° C.

Of the disks obtained, the adhesion of electroless plating and the surface characteristics such as the smoothness of surface etc. were examined. These results are shown in Table 2 in comparison with those of conventional JIS A5086 alloy (Mg 4.0%, Mn 0.5%, Cr 0.2%, Fe 0.3%, Cu 0.03% and the remainder Al and other inevitable impurities).

Besides, in this case, the evaluation of adhesion was made by heating the samples for 30 minutes at 400° C. and examining the peeling-off and the swelling of plating after immediate cooling with water. Moreover, as to the smoothness, the surface roughness was measured by using Universal Surface Roughness Tester SE-3H (made by Kosaka Laboratory) after Ni plating, and the results were expressed by 4-point averages of center line average height (Ra) prescribed in JIS B0601. Furthermore, the surface defects after plating were observed visually and the results were listed together in Table 2.

TABLE 2

| Div. of alloy | No. | Composition of alloy (%) | | | | | | | | Adhesion | Surface roughness Ra (μm) or Surface characteristics |
|---|---|---|---|---|---|---|---|---|---|---|---|
| | | Mg | Cu | Fe | Cr | Zr | Ti | B | Al | | |
| Alloy of the invention | 2-1 | 2.4 | 0.75 | 0.02 | — | — | — | — | Balance | ○ | 0.031 |
| | 2-2 | 4.2 | 0.21 | 0.05 | — | — | — | — | " | ○ | 0.027 |
| | 2-3 | 5.2 | 1.15 | 0.03 | — | — | — | — | " | ○ | 0.026 |
| | 2-4 | 5.0 | 0.88 | 0.07 | — | — | — | — | " | ○ | 0.033 |
| | 2-5 | 3.8 | 0.23 | 0.04 | 0.05 | — | — | — | " | ◎ | 0.028 |
| | 2-6 | 4.0 | 0.24 | 0.06 | — | 0.08 | — | — | " | ◎ | 0.030 |
| | 2-7 | 3.7 | 0.20 | 0.03 | — | — | 0.002 | — | " | ◎ | 0.022 |
| | 2-8 | 4.2 | 0.22 | 0.04 | — | — | — | 0.001 | " | ◎ | 0.027 |
| | 2-9 | 4.0 | 0.20 | 0.02 | 0.03 | — | 0.001 | — | " | ◎ | 0.026 |
| | 2-10 | 4.1 | 0.20 | 0.04 | — | 0.07 | 0.001 | 0.001 | " | ◎ | 0.023 |
| | 2-11 | 3.9 | 0.22 | 0.04 | 0.12 | 0.10 | 0.01 | 0.02 | " | ◎ | 0.024 |
| | 2-12 | 4.0 | 1.01 | 0.03 | 0.15 | — | — | — | " | ◎ | 0.028 |
| | 2-13 | 3.7 | 1.22 | 0.02 | — | — | 0.005 | — | " | ◎ | 0.022 |
| | 2-14 | 4.4 | 1.38 | 0.03 | — | 0.10 | 0.01 | — | " | ◎ | 0.020 |
| | 2-15 | 3.8 | 1.10 | 0.03 | 0.02 | — | 0.001 | 0.001 | " | ◎ | 0.026 |
| Comparative alloy | 2-16 | 4.0 | 0.01 | 0.05 | — | — | — | — | " | X | 0.108 |
| | 2-17 | 2.8 | 0.01 | 0.06 | 0.11 | 0.12 | 0.008 | 0.006 | " | X | 0.126 |
| | 2-18 | 3.8 | 2.5 | 0.03 | — | — | — | — | " | X | 0.135 |
| | 2-19 | 5.1 | 2.8 | 0.04 | 0.05 | 0.11 | 0.02 | — | " | X | 0.122 |
| | 2-20 | 3.7 | 0.1 | 0.3 | — | — | — | — | " | ○ | (Pit defects) |
| | 2-21 | 4.2 | 0.32 | 0.07 | 0.68 | — | — | — | " | ◎ | (Pit defects) |
| | 2-22 | 3.9 | 0.20 | 0.05 | 0.01 | 0.37 | — | 0.01 | " | ◎ | (Pit defects) |
| | 2-23 | 3.8 | 0.15 | 0.06 | 0.27 | 0.28 | 0.03 | 0.002 | " | ◎ | (Pit defects) |
| Conv. alloy | 2-24 | (JIS A5086 alloy) | | | | | | | | X | (Pit defects) |

As evident from Table 2, it can be seen that alloys No. 2-1 to 2-15 have approximately equal strength and far excellent adhesion of electroless plating and surface characteristics compared with conventional alloy No. 2-24, and are suitable for the substrate of magnetic disk.

Whereas, all comparative alloys No. 2-16 to 2-23, the composition thereof being out of the range of alloys of the invention, are seen to be inferior in one or both of the adhesion of electroless plating and the surface characteristics.

EXAMPLE 3

Similarly to Example 2, the commercial Al metal with a purity of higher than 99.5% was melted, the alloy melts with ingredient compositions shown in Table 3 were prepared by adding the elements for alloy to this, and mirror-like disks were obtained. After the pretreatment, electroless Ni-P alloy plating was carried out in a similar way to Example 2 and the adhesion of electroless plating, the surface smoothness and the existence of surface defects were examined. These results are shown in Table 3 comparing with those of conventional JIS A5086 alloy (Mg 4%, Mn 0.5%, Cr 0.2%, Fe 0.3%, Si 0.2%, Cu 0.05%, Ti 0.05%, Zn 0.1% and the remainder Al).

TABLE 3

| Div. of alloy | No. | Composition of alloy (%) | | | | | | | | Adhesion | Surface roughness Ra ($\mu$m) or Surface characteristics |
|---|---|---|---|---|---|---|---|---|---|---|---|
| | | Mg | Cu | Fe | Cr | Zr | Ti | B | Al | | |
| Alloy of the invention | 3-1 | 2.7 | 0.66 | 0.04 | — | — | — | — | Balance | ◯ | 0.028 |
| | 3-2 | 4.1 | 0.19 | 0.07 | — | — | — | — | " | ◯ | 0.026 |
| | 3-3 | 4.3 | 5.92 | 0.03 | — | — | — | — | " | ◯ | 0.031 |
| | 3-4 | 5.2 | 0.75 | 0.05 | — | — | — | — | " | ◯ | 0.030 |
| | 3-5 | 3.7 | 0.65 | 0.06 | 0.04 | — | — | — | " | ◎ | 0.028 |
| | 3-6 | 4.0 | 1.75 | 0.03 | — | 0.11 | — | — | " | ◎ | 0.027 |
| | 3-7 | 3.8 | 3.27 | 0.03 | — | — | 0.012 | — | " | ◎ | 0.025 |
| | 3-8 | 4.3 | 6.12 | 0.08 | — | — | — | 0.001 | " | ◎ | 0.022 |
| | 3-9 | 4.4 | 0.70 | 0.02 | 0.15 | — | 0.006 | — | " | ◎ | 0.023 |
| | 3-10 | 4.1 | 2.23 | 0.04 | — | 0.08 | 0.001 | 0.014 | " | ◎ | 0.027 |
| | 3-11 | 3.9 | 0.38 | 0.06 | 0.06 | 0.07 | 0.001 | 0.002 | " | ◎ | 0.026 |
| | 3-12 | 4.0 | 3.51 | 0.03 | 0.12 | — | — | — | " | ◎ | 0.023 |
| | 3-13 | 3.7 | 0.72 | 0.08 | — | — | 0.033 | — | " | ◯ | 0.025 |
| | 3-14 | 4.2 | 1.54 | 0.04 | — | 0.10 | 0.01 | — | " | ◯ | 0.030 |
| | 3-15 | 3.9 | 0.83 | 0.06 | 0.02 | — | 0.003 | 0.005 | " | ◯ | 0.029 |
| Comparative alloy | 3-16 | 3.8 | 0.02 | 0.07 | — | — | — | — | " | X | 0.018 |
| | 3-17 | 5.2 | 0.01 | 0.02 | 0.08 | 0.11 | 0.005 | 0.006 | " | X | 0.119 |
| | 3-18 | 4.0 | 7.75 | 0.03 | — | — | — | — | " | X | 0.112 |
| | 3-19 | 2.9 | 8.24 | 0.04 | 0.03 | 0.09 | 0.01 | — | " | X | 0.122 |
| | 3-20 | 4.4 | 1.27 | 0.28 | — | — | — | — | " | ◯ | (Pit defects) |
| | 3-21 | 4.3 | 2.39 | 0.06 | 0.55 | — | — | — | " | ◯ | (Pit defects) |
| | 3-22 | 3.9 | 0.70 | 0.05 | 0.01 | 0.42 | — | 0.02 | " | ◯ | (Pit defects) |
| | 3-23 | 3.9 | 0.95 | 0.03 | 0.30 | 0.25 | 0.01 | 0.03 | " | ◎ | (Pit defects) |
| Conv. alloy | 3-24 | (JIS A5086 alloy) | | | | | | | | X | (Pit defects) |

As evident from Table 3, it can be seen that all of alloys of the invention No. 3-1 to 3-15 have far excellent adhesion and characteristics such as surface smoothness etc. compared with conventional alloy No. 3-24. Whereas, in the cases of comparative alloys, the composition thereof being out of the range of alloys of the invention, the adhesion and the characteristics such as surface smoothness etc. are seen to become poor. Namely, comparative alloys No. 3-16 and No. 3-17 with less content of Zn and comparative alloys No. 3-18 and No. 3-19 with more content of Zn exhibit remarkably poor adhesion and surface characteristics in all cases, and the surface characteristics of comparative alloy No. 3-20 with more content of Fe and comparative alloys No. 3-21 to 3-23 with more content of Cr, Zr, Ti, B, etc. are seen to be poor due to the intermetallic compounds.

As described, according to the invention, the adhesion of electroless nickel plating being the primer treatment for the covering with magnetic substance and the surface characteristics (smoothness and inexistence of defects such as pit etc.) are improved. Therefore, the invention exerts a remarkable effect on the improvement in the quality thereof in the mass production of magnetic disk.

What is claimed is:

1. An aluminum alloy, suitable as a substrate for a magnetic disk, consisting essentially of 2 to 6 wt.% of Mg, and 0.12 to 2.0 wt.% of Cu; or 2 to 6 wt.% of Mg, and 0.28 to 7.0 wt.% of Zn; or 2 to 6 wt.% of Mg, 0.12 to 2.0 wt.% of Cu and 0.28 to 7.0 wt.% of Zn, wherein each aluminum alloy contains not more than 0.06 wt.% of Fe, and from an effective amount of two or more of Cr, Zr, Ti and B to not more than a total of 0.5 wt.% thereof, to render minute crystal particles in said alloy, thereby rendering the surface of said alloy smooth after plating, with the proviso that the total content of Cr and Zr is not more than 0.3 wt.%, and the total content of Ti and B is not more than 0.05 wt.%.

2. The aluminum alloy of claim 1, suitable as a substrate for a magnetic disk, consisting essentially of 2 to 6 wt.% of Mg, 0.12 to 2.0 wt.% of Cu and not more than 0.06 wt.% of Fe.

3. The aluminum alloy of claim 2 wherein said alloy contains Cu in the amount of about 0.20 to 1.38 wt.%.

4. The aluminum alloy of claim 1, suitable as a substrate for a magnetic disk, consisting essentially of 2 to 6 wt.% of Mg, 0.28 to 7.0 wt.% of Zn and not more than 0.06 wt.% of Fe.

5. The aluminum alloy of claim 4, wherein said alloy contains Zn in the amount of about 0.38 to 6.12 wt.%.

6. The aluminum alloy of claim 1, suitable as a substrate for a magnetic disk, consisting essentially of 2.0 to 6 wt.% of Mg, 0.12 to 2.0 wt.% of Cu, 0.28 to 7.0 wt.% of Zn and not more than 0.06 wt.% of Fe.

7. The aluminum alloy of claim 6, wherein said alloy contains Cu in the amount of about 0.12 to 1.9 wt.% and contains Zn in the amount of about 0.30 to 6.8 wt.%.

8. The aluminum alloy of claim 1, wherein said alloy has alloy crystals having particle diameters of less than 80 $\mu$m.

9. The aluminum alloy of claim 1, which contains about 0.05% by wt. of Fe.

10. A substrate for a magnetic disk, comprising the aluminum alloy of claim 1.

* * * * *

UNITED STATES PATENT AND TRADEMARK OFFICE
CERTIFICATE OF CORRECTION

PATENT NO. : 4,840,685
DATED : June 20, 1989
INVENTOR(S) : Motohiro NABAE

It is certified that error appears in the above-identified patent and that said Letters Patent is hereby corrected as shown below:

--On the Title Page, Item [30], the Foreign Application Priority Data has been omitted. It should read as follows:

May 21, 1989 [JP] Japan....................60-108800--

Signed and Sealed this

Third Day of April, 1990

Attest:

HARRY F. MANBECK, JR.

Attesting Officer

Commissioner of Patents and Trademarks